(12) United States Patent
Kang et al.

(10) Patent No.: US 9,158,670 B1
(45) Date of Patent: Oct. 13, 2015

(54) SYSTEM AND METHOD FOR DYNAMICALLY ADJUSTING GARBAGE COLLECTION POLICIES IN SOLID-STATE MEMORY

(75) Inventors: Ho-Fan Kang, San Diego, CA (US);
Jerry Lo, Hacienda Heights, CA (US);
Johnny Lam, Firestone, CO (US)

(73) Assignee: Western Digital Technologies, Inc., Irvine, CA (US)

( * ) Notice: Subject to any disclaimer, the term of this patent is extended or adjusted under 35 U.S.C. 154(b) by 940 days.

(21) Appl. No.: 13/173,266

(22) Filed: Jun. 30, 2011

(51) Int. Cl.
*G06F 12/00* (2006.01)
*G06F 12/02* (2006.01)

(52) U.S. Cl.
CPC .................................. *G06F 12/0246* (2013.01)

(58) Field of Classification Search
CPC .................................................. G06F 12/0246
USPC .......................................................... 711/103
See application file for complete search history.

(56) References Cited

U.S. PATENT DOCUMENTS

| | | | |
|---|---|---|---|
| 5,093,780 A | 3/1992 | Sunahara | |
| 5,123,094 A | 6/1992 | MacDougall | |
| 5,634,099 A | 5/1997 | Andrews et al. | |
| 5,819,310 A | 10/1998 | Vishlitzky et al. | |
| 6,067,199 A | 5/2000 | Blumenau | |
| 6,237,060 B1 * | 5/2001 | Shilts et al. | 711/100 |
| 6,338,122 B1 | 1/2002 | Baumgartner et al. | |
| 6,430,663 B1 | 8/2002 | Ding | |
| 6,475,062 B1 | 11/2002 | Kubota et al. | |
| 6,493,160 B1 | 12/2002 | Schreck | |
| 6,678,801 B1 | 1/2004 | Greim et al. | |
| 6,711,660 B1 | 3/2004 | Milne et al. | |
| 6,969,989 B1 | 11/2005 | Mei | |
| 7,082,494 B1 | 7/2006 | Thelin et al. | |
| 7,114,041 B2 | 9/2006 | Hammitt et al. | |
| 7,146,525 B2 | 12/2006 | Han et al. | |
| 7,174,467 B1 | 2/2007 | Helms et al. | |
| 7,310,699 B2 | 12/2007 | Sinclair | |
| 7,313,641 B2 | 12/2007 | Koch et al. | |
| 7,315,917 B2 | 1/2008 | Bennett et al. | |
| 7,340,580 B2 | 3/2008 | Kinoshita | |
| 7,363,396 B2 | 4/2008 | Liu et al. | |
| 7,363,421 B2 | 4/2008 | Di Sena et al. | |

(Continued)

OTHER PUBLICATIONS http://www.anandtech.com, Jun. 2011.

(Continued)

*Primary Examiner* — Larry Mackall
(74) *Attorney, Agent, or Firm* — McDermott Will & Emery LLP

(57) ABSTRACT

Embodiments of the invention are directed to optimizing the selection of memory blocks for garbage collection in solid state devices to efficiently maximize the amount of memory freed by garbage collection operations. The systems and methods disclosed herein provide for the efficient selection of optimal or near-optimal garbage collection candidate blocks, with the most optimal selection defined as block(s) with the most invalid pages. In one embodiment, a controller classifies memory blocks into various invalid block pools by the amount of invalid pages each block contains. In one embodiment, the controller selects for garbage collection a block from a non-empty pool of blocks with the highest minimum amount of invalid pages. One or more of the pools have minimum thresholds that can be dynamically adjusted according to an observed usage condition, such as a change of an over-provisioning amount in the storage state device.

21 Claims, 6 Drawing Sheets

(56) References Cited

U.S. PATENT DOCUMENTS

| | | |
|---|---|---|
| 7,366,826 B2 | 4/2008 | Gorobets et al. |
| 7,424,587 B2 | 9/2008 | Caulkins et al. |
| 7,441,054 B2 | 10/2008 | Wu et al. |
| 7,441,067 B2 | 10/2008 | Gorobets et al. |
| 7,457,903 B2 | 11/2008 | Purdham et al. |
| 7,487,286 B2 | 2/2009 | Nagano et al. |
| 7,516,355 B2 | 4/2009 | Noya et al. |
| 7,582,868 B2 | 9/2009 | Jiang et al. |
| RE41,011 E | 11/2009 | Han et al. |
| 8,521,972 B1 | 8/2013 | Boyle et al. |
| 8,725,931 B1 | 5/2014 | Kang |
| 9,026,716 B2 | 5/2015 | Kang et al. |
| 2002/0083111 A1 | 6/2002 | Row et al. |
| 2002/0138694 A1 | 9/2002 | Isshiki |
| 2003/0051110 A1 | 3/2003 | Gaspard et al. |
| 2004/0179386 A1 | 9/2004 | Jun |
| 2004/0193743 A1 | 9/2004 | Byers et al. |
| 2005/0071537 A1 | 3/2005 | New et al. |
| 2005/0193081 A1 | 9/2005 | Gruber et al. |
| 2005/0216657 A1 | 9/2005 | Forrer et al. |
| 2006/0020849 A1 | 1/2006 | Kim |
| 2006/0041812 A1* | 2/2006 | Rajski et al. .................. 714/742 |
| 2006/0106981 A1 | 5/2006 | Khurshudov et al. |
| 2006/0155917 A1 | 7/2006 | Di Sena et al. |
| 2007/0016721 A1 | 1/2007 | Gay |
| 2007/0043900 A1 | 2/2007 | Yun |
| 2008/0082736 A1 | 4/2008 | Chow et al. |
| 2008/0091872 A1 | 4/2008 | Bennett et al. |
| 2008/0098192 A1* | 4/2008 | Im et al. ....................... 711/170 |
| 2008/0235443 A1 | 9/2008 | Chow et al. |
| 2008/0263305 A1 | 10/2008 | Shu et al. |
| 2008/0288717 A1 | 11/2008 | Torabi |
| 2008/0307164 A1 | 12/2008 | Sinclair |
| 2009/0012976 A1 | 1/2009 | Kang et al. |
| 2009/0017220 A1 | 1/2009 | Muller et al. |
| 2009/0070502 A1 | 3/2009 | Noha et al. |
| 2009/0116475 A1 | 5/2009 | Krzyzanowski et al. |
| 2009/0150599 A1 | 6/2009 | Bennett |
| 2009/0154026 A1 | 6/2009 | Jiang et al. |
| 2009/0172258 A1 | 7/2009 | Olbrich et al. |
| 2009/0172260 A1 | 7/2009 | Olbrich et al. |
| 2009/0222618 A1* | 9/2009 | Cho .............................. 711/103 |
| 2009/0313501 A1* | 12/2009 | Hallivuori ...................... 714/15 |
| 2010/0088482 A1* | 4/2010 | Hinz ............................. 711/166 |
| 2010/0325351 A1 | 12/2010 | Bennett |
| 2011/0010490 A1 | 1/2011 | Kwon et al. |
| 2011/0066788 A1 | 3/2011 | Eleftheriou et al. |
| 2011/0264843 A1* | 10/2011 | Haines et al. ................. 711/103 |
| 2011/0289260 A1* | 11/2011 | Wang et al. ................... 711/103 |
| 2012/0239851 A1* | 9/2012 | Calvert et al. ................ 711/103 |

OTHER PUBLICATIONS

Taratorin, Alexander M. and Klaas B. Klassen, Observation of Recording Pole Instability in Perpendicular Recording, IEEE Transaction on Magnetics, vol. 42, No. 10, Oct. 2006, pp. 2267-2269.

Hu et al., "Write Amplification Analysis in Flash-Based Solid State Drives", SYSTOR'09, Haifa, 2009, Zurich Research Laboratory, copyright 2009 IBM Corporation, downloaded on May 12, 2010 from https://www.research.ibm.com/haifa/conferences/systor2009/papers/2_2_2.pdf, 13 pages.

* cited by examiner

SYSTEM AND METHOD FOR DYNAMICALLY ADJUSTING GARBAGE COLLECTION POLICIES IN SOLID-STATE MEMORY

BACKGROUND

1. Technical Field

This disclosure relates to solid-state storage systems. In particular, this disclosure relates to a system and method for dynamically adjusting garbage collection policies in solid state storage systems.

2. Description of Related Art

Solid-state storage subsystems execute many commands in the course of their normal operation. For example, garbage collection is frequently performed on memory blocks that may contain both valid and invalid data. When such a memory block is selected for garbage collection, the garbage collection operation copies valid data within the memory block to a new location in memory and then erases the entire memory block, making the entire block available for future data writes. Therefore, the amount of memory freed by the garbage collection process depends on the amount of invalid pages within the memory blocks selected for garbage collection.

BRIEF DESCRIPTION OF THE DRAWINGS

Systems and methods which embody the various features of the invention will now be described with reference to the following drawings, in which.

DETAILED DESCRIPTION

Figure 1:
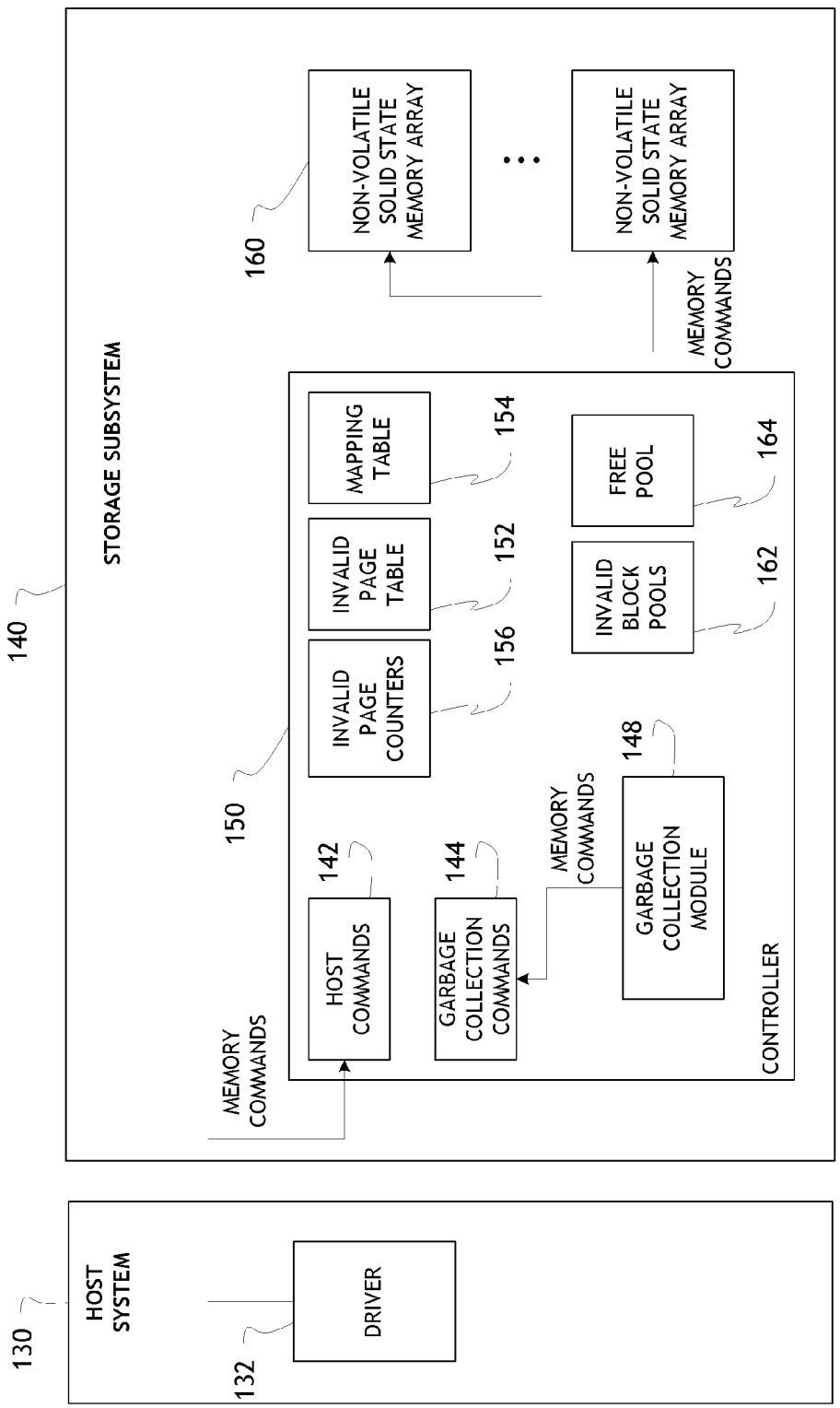
FIG. 1 is a block diagram illustrating a solid-state storage subsystem according to one embodiment.

While certain embodiments of the inventions are described, these embodiments are presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions.

Overview

Embodiments of the invention are directed to optimizing the selection of memory blocks for garbage collection to maximize the amount of memory freed by garbage collection operations. The systems and methods disclosed herein provide for the efficient selection of optimal or near-optimal garbage collection candidate blocks, with the most optimal selection defined as block(s) with the most invalid pages in one embodiment. In one embodiment, a controller classifies memory blocks into various invalid block pools by the amount (e.g., a minimum amount) of invalid pages each block contains. When garbage collection is performed, the controller in one embodiment selects a block from a non-empty pool of blocks with the highest minimum amount of invalid pages. The pools facilitate the optimal or near-optimal selection of garbage collection candidate blocks in an efficient manner and the data structure of the pools can be implemented with bitmasks, which take minimal space in memory.

One or more of the invalid block pools may have a dynamically adjustable minimum threshold of invalid pages for its blocks (e.g., a certain threshold percentage). In one embodiment, at least one such pool has a threshold amount/percentage that is set in accordance with an observed usage condition, which may reflect an the amount of over-provisioning (additional storage over stated capacity) provided in the non-volatile memory arrays, or a common range of percentage of invalid pages found in blocks that have been garbage collected. In one embodiment, as the amount of over-provisioning is adjusted, the minimum threshold of the dynamic invalid block pool is also adjusted. This optimizes the garbage collection process because there is a correlation between the amount of over-provisioning and the percentage of invalid pages that are likely to be found in the blocks, based on a mathematical property of the over-provisioned amount in relation to the stated capacity. Thus for example, a storage device with 25% over-provisioning may produce many blocks with 25% invalid pages once the storage device begins to reach into the provisioned amount. Setting the dynamic pool threshold to that amount can thus capture these blocks.

Although the present disclosure describes various embodiments as applicable to blocks, the embodiments are not so limited and are applicable to other units of memory such as superblocks. Also, as used in this application, "non-volatile memory" typically refers to solid-state memory such as NAND flash. However, the systems and methods of this disclosure may also be useful in more conventional hard drives and hybrid drives including both solid-state and hard drive components. As such, while certain internal operations are referred to which typically are associated with solid-state drives, such as "wear leveling" and "garbage collection," analogous operations for hard drives can also take advantage of this disclosure. Solid-state memory may comprise a wide variety of technologies, such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory, NOR memory, EEPROM, Ferroelectric Memory (FeRAM), or other discrete NVM (non-volatile memory) chips. The solid-state storage devices may be physically divided into planes, blocks, pages, and sectors, as is known in the art. Other forms of storage (e.g., battery backed-up volatile DRAM or SRAM devices, magnetic disk drives, etc.) may additionally or alternatively be used.

System Overview

FIG. 1 is a block diagram illustrating a storage subsystem embodiment. As shown, a storage subsystem 140 includes a controller 150, which in turn includes a host command queue 142, a garbage collection command queue 144, and a garbage collection module 148. In one embodiment, the host command queue 142 receives memory commands from a driver 132 residing within a host system 130 and the garbage collection command queue 144 receives commands from the garbage collection module 148, which manages garbage collection. In other embodiments, the commands from the driver 132 and the garbage collection module 148 are received into a single queue for execution. The memory commands from the driver 132 may include write and read commands issued by the host system 130, while memory commands from the garbage collection module 148 may include commands used for garbage collection. As further shown in FIG. 1, in one embodiment, the controller 150 executes the commands in the host command queue 142 and the garbage collection command queue 144 in one or more non-volatile solid-state memory arrays 160.

The controller 150 also maintains several data structures including, in one embodiment, an invalid page table 152 and a mapping table 154. These data structures may reside in volatile memory such as DRAM. In one embodiment, the invalid page table 152 keeps track of the validity of data located at physical page addresses throughout the non-volatile solid-state memory arrays 160, while the mapping table 154 keeps track of the correspondence between logical block addresses (LBA) and physical page addresses in the non-volatile solid-state memory arrays 160.

In one embodiment, other data structures include invalid page counters 156, invalid block pools 162, and a free pool 164. In one embodiment, the assignment of blocks to the various pools are indicated by data markers such as bitmasks, though other methods of indication such as data flags or data tables are also possible. In one embodiment, invalid page counters 156 are maintained for at least some of the memory blocks in the memory arrays 160. In one embodiment, an invalid page counter 156 is maintained for each block and tracks the number of invalid pages within the associated block. In one embodiment, the invalid page counters 156 and/or the invalid page table 152 are stored in volatile memory such as dynamic random access memory (DRAM), with persistent copies stored in the non-volatile memory 160.

The memory blocks are assigned in one embodiment to various invalid block pools 162. For example, in a storage subsystem initially configured with 28% over-provisioning, blocks that are in use may be classified into a pool for blocks with at least 7% invalid pages, a dynamic pool for blocks with at least 28% invalid pages, a pool for blocks with at least 50% invalid pages, a pool for blocks with at least 75% invalid pages, or a pool for blocks with 100% invalid pages. Blocks that are available for new writes are classified into the free pool 164. As the amount of over-provisioning is adjusted, the dynamic pool may be adjusted accordingly. In one embodiment, the data structures and/or data related to the pool assignments are stored, for example, in volatile memory such as static random access memory (SRAM) and persistent copies may be additionally stored in the non-volatile memory 160. The use and maintenance of these data structures for garbage collection will be further described below.

Maintaining Invalid Page Data of Memory Blocks

Figure 2:
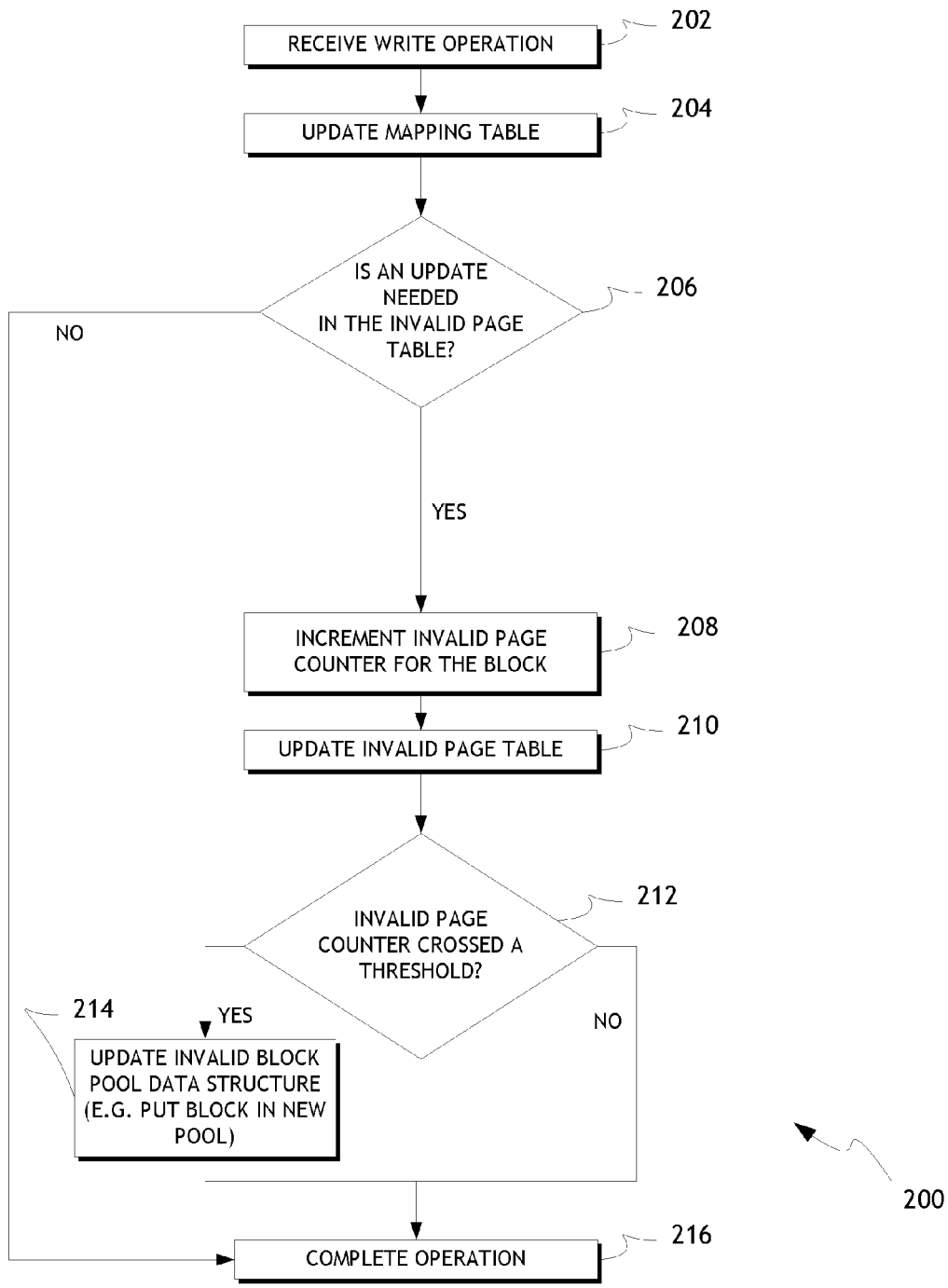
FIG. 2 is a flow diagram illustrating a method for maintaining invalid page information on memory blocks within a solid-state storage subsystem according to one embodiment.

FIG. 2 is a flow diagram illustrating a method 200 for maintaining invalid page information on memory blocks according to one embodiment. The method 200 is performed by the controller 150 in one embodiment. In block 202, the controller 150 begins by receiving a write command (operation) for execution. The write command may be issued by the host system 130. In block 204, the controller updates the mapping table 154 as part of executing the write command. In one embodiment, the controller updates the mapping table by first locating, in the mapping table, an entry for the LBA in the write command to determine a physical address that corresponds to the LBA, and then by updating the located entry with the new physical address at which the new data is written.

For example, a write may be directed to LBA 10, which prior to the write operation was mapped to block 5, page 2. Before the actual write to memory, the controller updates the mapping table so that the entry for LBA 10 corresponds to the new location at which the data will be written (e.g., block 12, page 4). Alternatively, the controller may update the mapping table after the actual write to memory. In block 206, the controller determines whether an update to the invalid page table is needed. In most instances this is needed unless the particular LBA entry associated with the write operation has not been previously assigned to any physical address. In the above example, since block 5, page 2 is now invalid, the portion of the invalid page table 154 covering block 5 needs to be updated. If an update is needed, the method proceeds to block 208, where the controller increments the invalid page counter 156 for the block with the change. The invalid page table 152 is then updated in block 210.

The controller performs another check in block 212 to determine if the page counter for the block with the change has crossed an invalid page threshold. If a threshold has been crossed, the block is re-assigned to a new invalid block pool in block 214. Following the example above, if an invalid page counter indicates that the number of invalid pages within block 5 has increased to 1024 out of 2048 total, then block 5 is re-assigned from the 28% invalid pool to the 50% invalid pool.

In one embodiment, the controller process that handles write operations from the host obtains a lock on the invalid page counter, invalid page table, and the invalid block pool data structure or a subset of those data structures while performing the above referenced update tasks. Since the garbage collection process consults with some of the same data structures in its operation, locking these data structures prevents the garbage collection process and other internal system processes from reading outdated data and executing commands that would cause data consistency problems. For example, as the invalid page table is used in one embodiment to block pending garbage collection commands from being executed on physical page addresses indicated as containing invalid information, locking the table while the updating takes place ensures that garbage collection commands attempting to write invalid data are properly blocked from execution in accordance with updated information. In other embodiments the various update steps may be executed in a different order than that shown in FIG. 2.

Using Invalid Page Data to Select Memory Blocks for Garbage Collection

Figure 3:
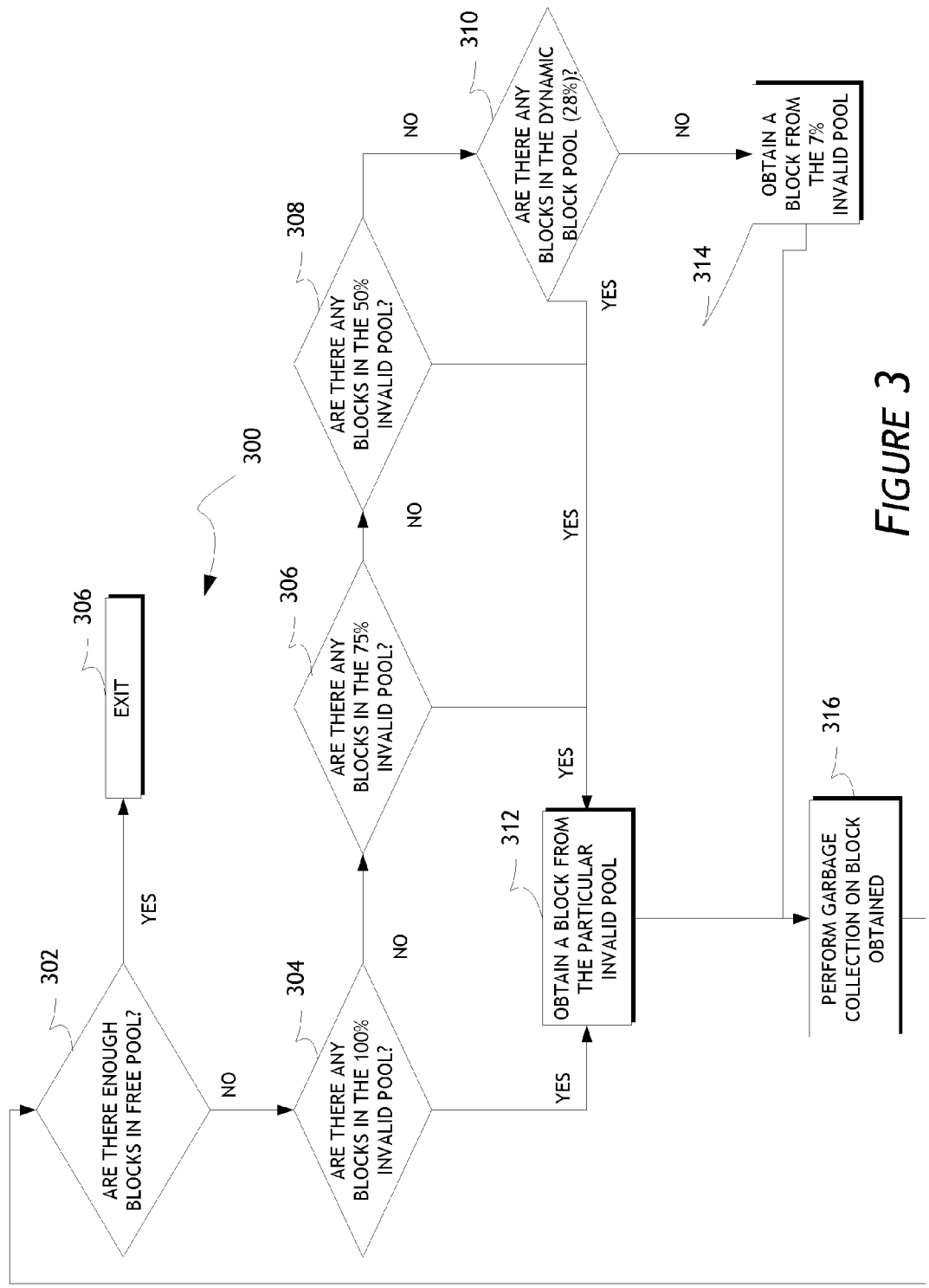
FIG. 3 is a flow diagram illustrating a method for selecting memory blocks for garbage collection in accordance with one embodiment.

FIG. 3 is a flow diagram illustrating a method for selecting memory blocks for garbage collection in accordance with one embodiment. In one embodiment, the method 300 is performed by the controller 150 to select an optimal or near-optimal candidate block for garbage collection. As discussed above, an optimal selection involves selecting a block with the highest number of invalid pages to maximize the amount of memory freed by a garbage collection operation.

The threshold percentages associated with the individual pools are provided in FIG. 3 as examples only and other percentages may be used. As noted above, in one embodiment a dynamic invalid block pool has a threshold that is adjusted according to an observed usage condition, which may reflect a current amount of over-provisioning in the storage subsystem. In the illustrated example, the dynamic threshold of 28% invalid pages corresponds to the 28% over-provisioning provided in the example storage subsystem. One property of over-provisioning is that the over-provisioning amount (28% in this example) guarantees at least one block with at least 28% invalid pages would be present when there are no more free blocks. So having a 28% dynamic pool would be helpful to capture this block. In other embodiments, the number of pools may be set to other numbers and the lowest threshold percentage may be higher or lower than the over-provisioning percentage. In one embodiment, the threshold of at least one pool is set at 100% or near 100% invalid to capture blocks that would yield the most amount of space after garbage collection. In another embodiment, a fall back pool (usually with a percentage in the single digit, such as 7%) is used along with a 100% invalid pool, and the rest of the pools may have dynamically adjusted thresholds.

The method 300 begins in block 302, where the controller determines whether there are enough blocks remaining in the free pool to accommodate pending write operations. Garbage collection is triggered if it is determined that there are not enough blocks in the free pool, and the method moves to block 304, where the controller determines if there are any blocks in the 100% invalid pool. If so, a memory block from that pool is selected in block 312. If not, the controller determines if there are any blocks in the 75% invalid pool in block 306. If so, a memory block from that pool is selected in block 312. The same process is repeated for the 50% invalid pool in block 308 if none are found in the 75% pool.

If there are no blocks in the 100%, 75%, or 50% pool, the method determines whether there is a block that can be chosen from the 28% (dynamic) pool in block 310. If not a block is taken from the 7% pool at block 314. The selected candidate block is then used in the garbage collection operation in block 316. In one embodiment, the 7% pool may set to be a fallback pool that matches the lowest (base) amount of over-provisioning in a storage device where the amount of over-provisioning is dynamically adjustable. The 7% may be based at least in part on an amount of difference between a 1,024 base and a 1,000 base storage unit accounting, as well as accounting for any other necessary storage space reserved to system operations, such as spare blocks allocated for replacing defective blocks. It is expected to contain at least one block because block 314 is reached only if the free pool is determined to have less than the threshold amount in block 302.

While the selection of a single block is shown in FIG. 3, other embodiments may select multiple blocks together from one or more pools for garbage collection. For example, if the controller determines that 45 blocks are needed for garbage collection and only 10 are in the 100% pool and 41 are in the 75% pool, the controller may select 10 from the 100% pool and the remaining 35 it needs from the 75% pool.

Dynamic Invalid Block Pool

Figure 4:
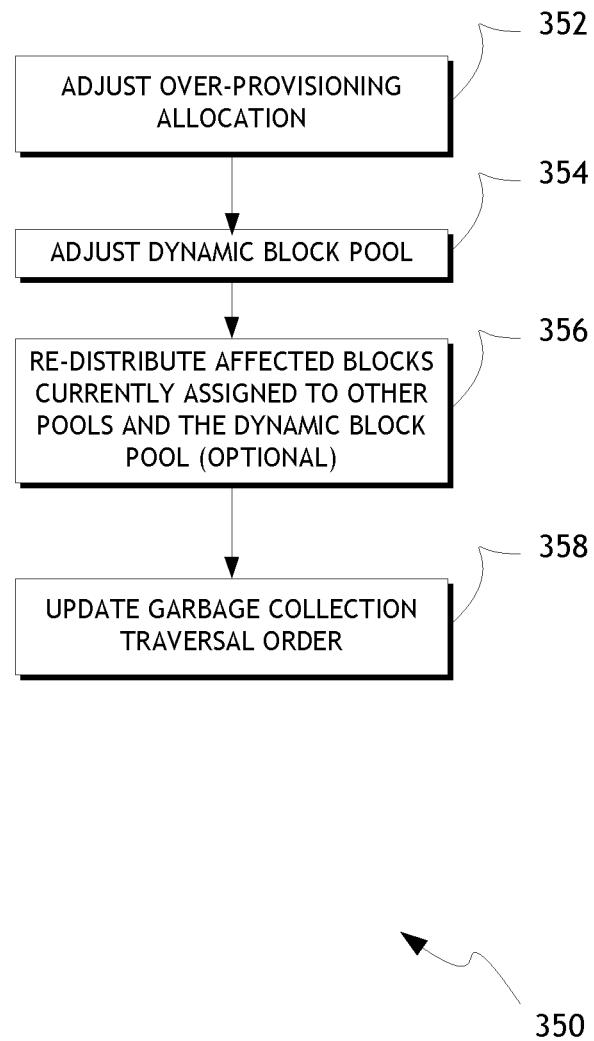
FIG. 4 is a flow diagram illustrating a method for adjusting a dynamic invalid block pool in accordance with one embodiment.

FIG. 4 is a flow diagram illustrating a method for adjusting a dynamic invalid block pool in accordance with one embodiment. In one embodiment, the method 350 shown in FIG. 4 is performed by the controller 150. At block 352, the controller adjusts the over-provisioning amount used in the storage subsystem. This can be triggered by a user command such as that issued from the host system 130, and/or by some mechanism internal to the storage subsystem that determines when an adjustment to the over-provisioning is needed. For example, the storage subsystem may encounter a situation in which all spare blocks have been used to replace bad blocks but additional bad blocks remain. The storage subsystem may choose to use some over-provisioning amount to replace the remaining bad blocks and thus decrease the over-provisioning amount. In another embodiment where the storage subsystem is a solid state device that is paired with a hard disk in a hybrid drive configuration, the controller of the hybrid drive may dynamically adjust the over-provisioning amount in the storage subsystem to adapt to the performance characteristics of the hybrid drive to usage conditions.

In block 354, the controller adjusts the dynamic block pool. For example, if the over-provisioning is changed from 25% to 46%, the dynamic block pool threshold may be changed from 25% invalid to 46% invalid as well. In other embodiments, the dynamic block pool is adjusted based on an observed usage condition, which may reflect an amount of over-provisioned capacity in non-volatile solid-state memory array, or may alternatively reflect a range of an amount of invalid pages that is frequently observed in memory blocks in non-volatile solid-state memory array. For example, the controller may observe that a large number of blocks are 22-33% and 90-93% invalid (through reviewing the invalid page counters of the blocks that have been garbage collected). The controller may adjust the one or more dynamic block pools to capture those blocks. For example, the controller may set one dynamic block pool to be a 22% minimum invalid pool and another dynamic block pool to be a 90% minimum invalid pool. In other embodiments, the controller may make such observation through a histogram which tracks the occurrence/frequency of blocks with certain percentages of invalid pages, and periodically adjust the dynamic pools according to recent histogram results. For example, a histogram with ten percentiles (e.g., 0% min. invalid, 10% min. invalid, 20% min. invalid, 30% min. invalid, etc.) may be used and one or more dynamic pools may be adjusted to match the percentile(s) with the most blocks.

In other embodiments where there are multiple dynamic block pools, some or all of the dynamic block pools may be adjusted as well. In one embodiment, the several dynamic block pools may have thresholds that are evenly distributed between 100% and X % invalid, where X is the amount of the current over-provisioning. Take, for example, the following setup for a 28% over-provisioning configuration: 100% (static), 76% (dynamic), 52% (dynamic), 28% (dynamic), and 7% (static). Since the difference between 100 and 28% is 72%, the 76% and 52% pools are spread out evenly within the difference span of 72% (two pools, 24% apart each). If the over-provisioning amount is changed to 40%, the pools may be updated to: 100% (static), 80% (dynamic), 60% (dynamic), 40% (dynamic), and 7% (static).

In block 356, the blocks affected by the changing of the dynamic pool thresholds are re-distributed. In one embodiment, this re-assignment of blocks to their appropriate pools may not be performed if the controller determines that the benefits do not outweigh the costs, since those affected blocks may eventually be garbage collected and removed from the pools. The costs of re-assignment involve performance costs associated with operations for updating the data to reflect the new pool assignments. On the other hand, post-reassignment, the benefits would be that each block is allocated to a more appropriate pool so garbage collection can recover more space per block and fewer data operations for garbage collection may be needed. Finally, in block 358, the garbage collection traversal order is updated to reflect the changes made to the pool(s). One such traversal order was previously described above in conjunction with FIGS. 3 (100%-75%-50%-28% (dynamic)-7%).

Multi-Pool Data Structure

Figure 5A:
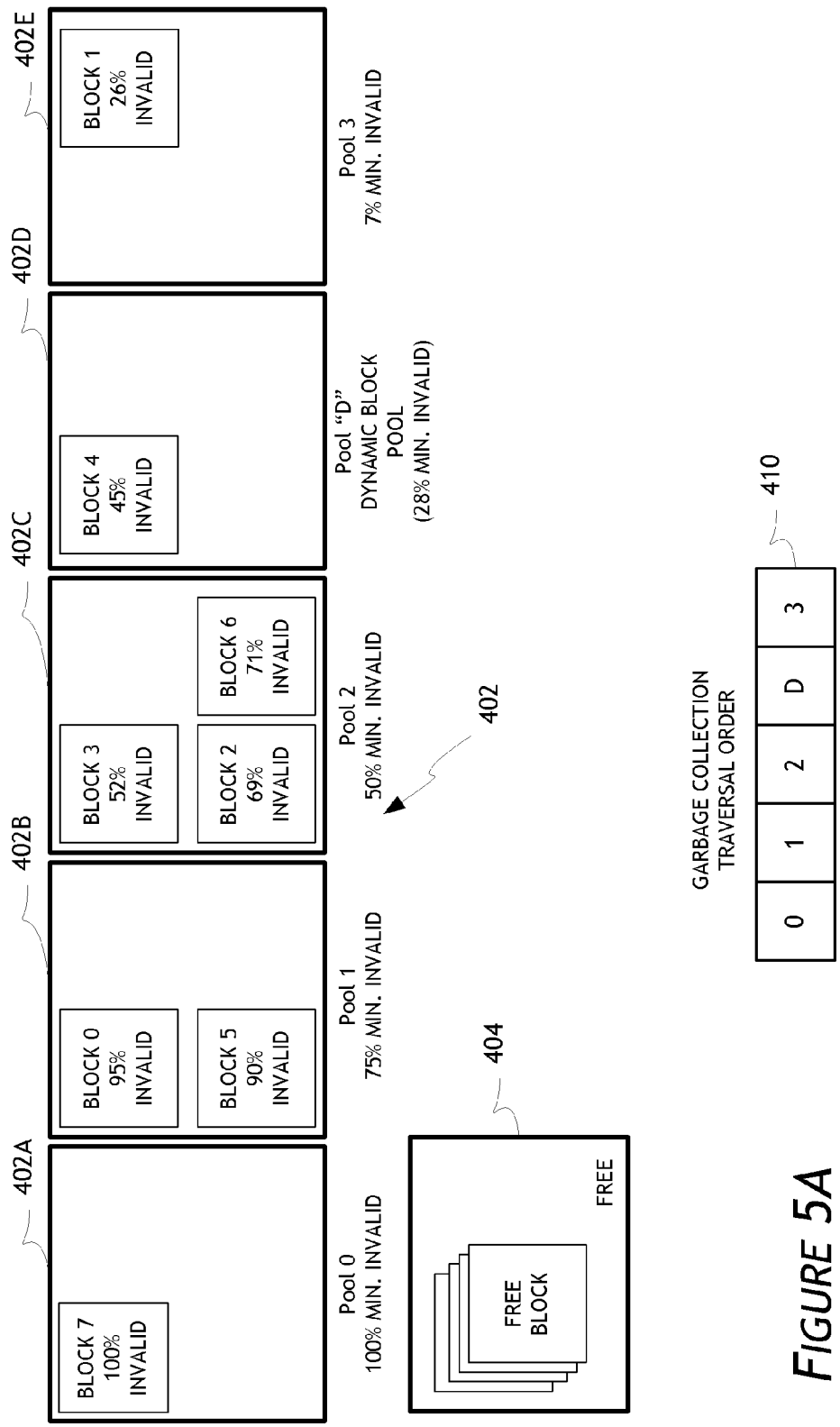
FIG. 5A-5B illustrate an example of using invalid block and free block pools, including a dynamic invalid block pool, to track memory blocks for garbage collection according to one embodiment.
Figure 5B:
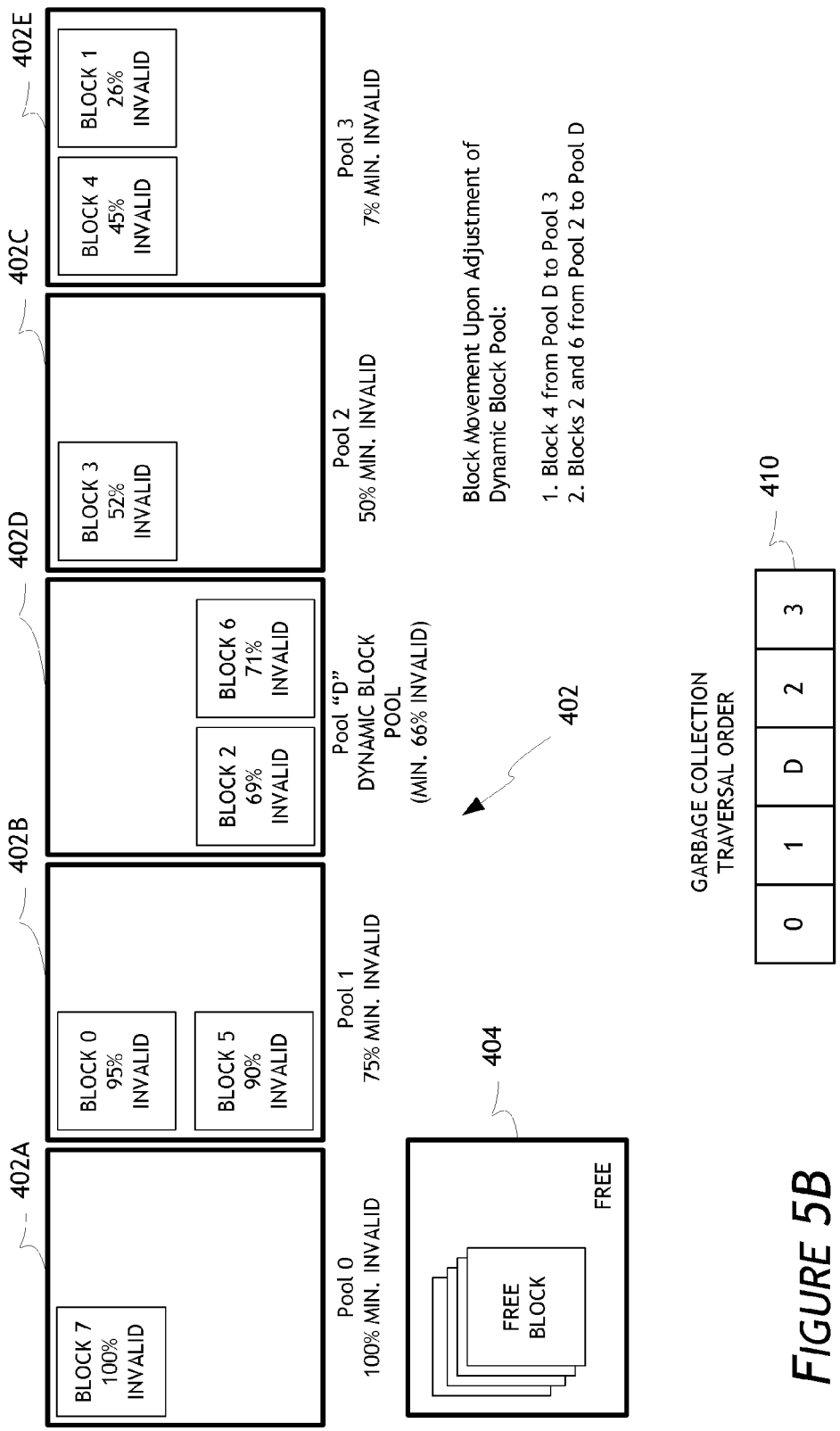

FIGS. 5A and 5B illustrate an example set of invalid block pools 402 with a dynamic pool that is undergoing adjustment according to one embodiment. As shown, example blocks 0-7 are distributed in the five pools 402A-E in accordance with the number of invalid pages each block contains. As previously shown in FIG. 3, the controller triggers garbage collection if it determines that there are not enough blocks in the free pool 404. As shown in FIG. 5A, the traversal order 410 is pool 0-pool 1-pool 2-pool D-pool 3. Thus, if and when this occurs, block 7 would be selected first for garbage collection since it belongs to the 100% invalid pool. If more blocks are still needed for garbage collection, in the next iteration the controller would select any block from pool 402B (block 0 or block 5), since pool 402A is now empty and pool 402B is now the non-empty pool with the highest minimum invalid page threshold (at least 75%). Pool D (dynamic pool) would be accessed when pool 2 is empty, and so on.

FIG. 5B shows a change in the dynamic pool threshold, which has been adjusted to 66% (e.g., to match the new over-provisioning amount). As a result, blocks 2, 4, and 6 have been re-assigned to different pools. In particular, block 4 (45% invalid) has been re-assigned to pool 3 (7% min.) since there is no longer a 28% pool. On the other hand, blocks 2 and 6 (previously in pool 2) have been re-assigned to pool D (66% min.) since they now meet pool D's minimum threshold. In one embodiment, in general, blocks are re-assigned to the pools with the highest minimum thresholds to which they can qualify. As shown, the garbage collection traversal order 410 is also updated as well to reflect the adjustment to the dynamic pool. Although the above examples associate the individual pools with certain minimum thresholds, in other embodiments the pools may be associated with maximum thresholds and the dynamic pool(s) may have such maximum thresholds that are adjustable as well.

Block Selection

In one embodiment, to achieve speed optimization, the selection of a block assigned to a pool with multiple blocks does not depend on the blocks' actual percentages of invalid pages and a candidate block within the pool may be selected based on the current location of a selection process or a block may be randomly selected from among blocks assigned to the same pool. The selection process may traverse the blocks in a consecutive fashion to locate a next available block assigned to the highest non-empty pool. For example, if the selection process last ended a search for a candidate block at block 1, block 5 would be selected since there are no more blocks in the 100% pool (block 7 has been taken) and block 5 is the first block in the 75% pool encountered in the selection process. Thus block 5 (90% invalid) may be selected from pool 402B even though it has a lower percentage than block 0 (95% invalid). In one embodiment, the blocks may be selected by a round-robin fashion with one or more pointers traversing a list of blocks, locating a next block with the highest pool assignment. One pointer may be used per pool to indicate the last block taken for a particular pool. In other embodiments, additional checks and/or comparisons may be performed so a block with a higher or the highest percentage within the same pool may be selected. In various embodiments, several blocks are selected at once and may span across different pools. However, in some embodiments, the selection progression remains from the pool of blocks with the highest minimum amount of invalid pages to the pool of blocks with the lowest minimum amount of invalid pages.

EXAMPLE IMPLEMENTATIONS

In one embodiment, the pool structure is implemented with bitmasks, and a block may be associated with one or more bits that indicate its assignment to the pools. For example, a four-pool structure may involve four corresponding bitmasks for the blocks, with each bitmask indicating whether the individual blocks belong to a particular pool. In one embodiment, additional checking bits may be assigned to a group of blocks to speed up the selection process. For example, a checking bit may be used to indicate the status of 32 blocks, such that when the checking bit is set to "0" the selection process can skip over the 32 blocks knowing that none of the blocks have a "1" bit indicating an assignment to the particular pool in question. If the checking bit is set to "1," the selection process will check the individual bits for the 32 blocks since the "1" indicates that at least one block is assigned to the particular pool. In another embodiment, additional checking bits may be assigned to groups of checking bits in a hierarchal order. For example, an additional checking bit may be assigned to a group of checking bits so that if any of the checking bits is set to "1," the additional bit will be set to "1" as well. The checking bit approach reduces the time needed to locate a block assigned to the pool with the highest minimum amount of invalid pages. In another embodiment, the pool assignments are maintained in a table.

The multi-pool data structure provides an efficient method for selecting optimal or near optimal candidate blocks for garbage collection. In one embodiment, a sorted linked list structure is used to organize the blocks that are eligible for garbage collection. In one embodiment, the blocks are sorted in the linked list by the amount of invalid pages in the blocks, so that the optimal candidate for garbage collection can be located by selecting a block from the front or back of the linked list (depending on the direction of the sort). In one embodiment, the above described pools are implemented in a sorted linked list structure with pointers to entries that correspond to the minimum invalid page thresholds of the individual pools, so that blocks assigned to the individual pools can be quickly located. In another embodiment, one or more linked lists are used for each pool, and blocks are assigned to a pool as described above and inserted into the one or more linked lists for the corresponding pool. In some embodiments, the pool data structure implemented with bitmasks may need substantially less overhead memory as compared to the linked list implementations. This difference can be substantial in storage subsystems in which there are potentially millions of blocks or tens of thousands of superblocks that may be candidates for garbage collection at any given time.

CONCLUSION

While certain embodiments of the inventions have been described, these embodiments have been presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions. For example, those skilled in the art will appreciate that in various embodiments, the actual steps taken in the processes shown in FIGS. 2, 3, and 4 may differ from those shown in the figures. Depending on the embodiment, certain of the steps described in the example above may be removed, others may be added, and the sequence of steps may be altered and/or performed in parallel. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A method for selecting memory blocks in a non-volatile solid-state memory array of a storage subsystem for garbage collection commands, the method comprising:
   maintaining statistical data related to an amount of invalid data within the memory blocks; and
   assigning the memory blocks to pools and recording assignments of the memory blocks to the pools, such that each pool consists of memory blocks having an amount of invalid data that satisfies the respective pool's minimum threshold, wherein at least some of the pools have different minimum thresholds than others, wherein at least some of the minimum thresholds are fixed and at least one minimum threshold is dynamic; and
   dynamically adjusting the minimum threshold associated with at least one of the pools based on an observed usage condition in the non-volatile solid-state memory array.

2. The method of claim 1, further comprising:
   selecting a memory block assigned to a pool with the highest minimum threshold for garbage collection.

3. The method of claim 2, wherein the selecting further comprises:
   traversing said plurality of pools beginning with a pool with the highest minimum threshold to identify a pool with the highest minimum threshold with at least one memory block assigned to the pool.

4. The method of claim 1, wherein the observed usage condition reflects a change in an amount of over-provisioned capacity in the non-volatile solid-state memory array.

5. The method of claim 1, wherein the observed usage condition reflects one or more ranges of a number of invalid pages in memory blocks in the non-volatile solid-state memory array.

6. The method of claim 5, wherein the range is detected through observing percentages of invalid pages in blocks that have been garbage collected.

7. The method of claim 6, wherein the percentages are tracked in a histogram.

8. The method of claim 1 further comprising:
   re-assigning at least one memory block in one of the plurality of pools other than the one with the adjusted minimum threshold to reflect the adjusting of the minimum threshold.

9. The method of claim 1 further comprising:
   updating the statistical data when a memory command causes a validity of a page within one of the memory blocks to be changed; and
   re-assigning the memory block containing the changed page to a new pool with a higher minimum threshold of invalid data when an amount of invalid data reflected in the updated statistical data meets the higher minimum threshold.

10. The method of claim 1, wherein recording assignments of the memory blocks to the pools further comprises using a data marker to indicate the assignment of a memory block to a pool.

11. The method of claim 1 further comprising updating at least some of the assignments of the memory blocks to the pools as part of performing garbage collection.

12. A storage subsystem, comprising:
   a non-volatile solid-state memory array; and
   a controller configured to:
      maintain, for a memory block in the non-volatile solid-state memory array, statistical data related to a number of invalid pages within the memory block;
      assign the memory blocks to pools and record assignments of the memory blocks to the pools, such that each pool consists of memory blocks having an amount of invalid data that satisfies the respective pool's minimum threshold, wherein at least some of the pools have different minimum thresholds than others, wherein at least some of the minimum thresholds are fixed and at least one minimum threshold is dynamic; and
      adjust the minimum threshold associated with at least one of the pools based on an observed usage condition in the non-volatile solid-state memory array.

13. The storage subsystem of claim 12, wherein the controller is further configured to:
   upon execution of a memory command that causes a change in a validity of a page within the memory block,
      update the statistical data associated with the memory block; and
      reassign the memory block to another pool when the updated statistical data reflects a number of invalid pages within the memory block that meets a minimum threshold of another pool with a higher minimum threshold than the minimum threshold of the pool to which the memory block is currently assigned.

14. The storage subsystem of claim 12, wherein the observed usage condition reflects a change in an amount of over-provisioned capacity in the non-volatile solid-state memory array.

15. The storage subsystem of claim 12, wherein the observed usage condition reflects one or more ranges of a number of invalid pages in memory blocks in the non-volatile solid-state memory array.

16. The storage subsystem of claim 15, wherein the range is detected through observing percentages of invalid pages in blocks that have been garbage collected.

17. The storage subsystem of claim 16, wherein the percentages are tracked in a histogram.

18. The storage subsystem of claim 12, wherein the controller is further configured to select, for garbage collection, a memory block assigned to a pool with a highest minimum threshold.

19. The storage subsystem of claim 12, wherein the plurality of pools comprise a pool configured for memory blocks with at least 7% invalid pages, a pool initially configured for memory blocks with at least 50% invalid pages, a pool initially configured for memory blocks with at least 75% invalid pages, a pool configured for memory blocks with 100% invalid pages, and a pool configured for memory blocks with a percent of invalid pages that match a percentage of capacity in the non-volatile solid-state memory array that is reserved for over-provisioning.

20. The storage subsystem of claim 12, wherein the controller is configured to record assignments of the memory blocks to the pools further by using a data marker to indicate the assignment of a memory block to a pool.

21. The storage subsystem of claim 12 wherein the controller is further configured to update at least some of the assignment of the memory blocks to the pools as part of performing garbage collection.

* * * * *